Sept. 28, 1926.
E. A. PAGE
AUTOMOBILE COMPASS
Filed Nov. 5, 1925
1,601,081
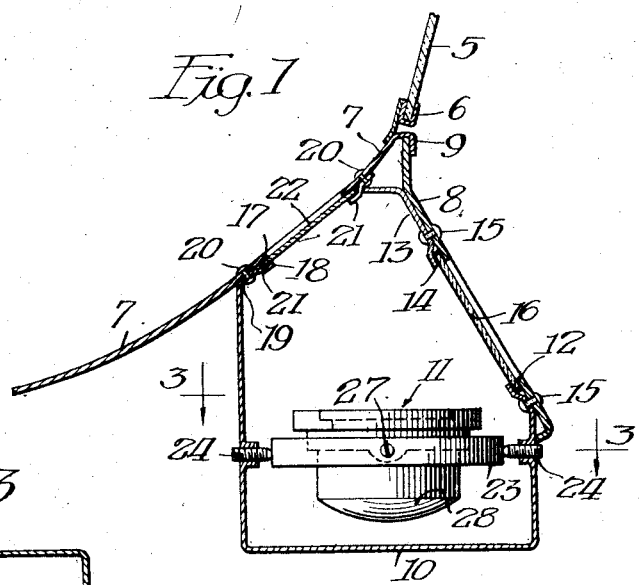
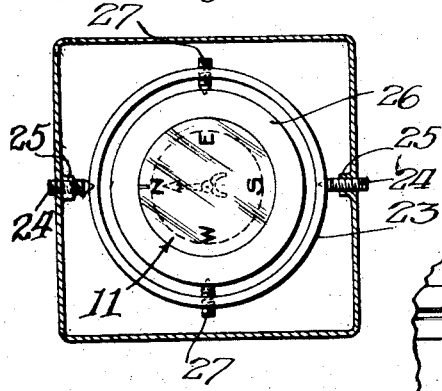
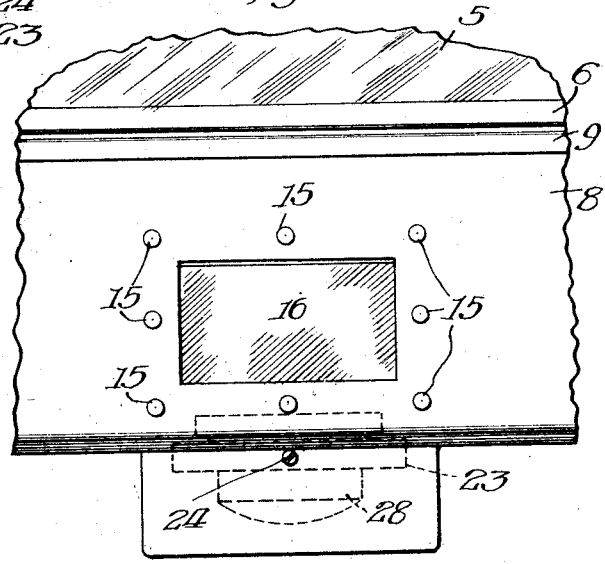
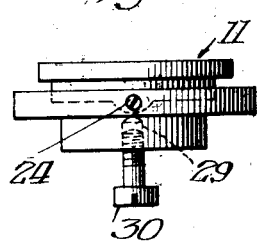
Inventor:
Edwin A. Page,
by Fisher, Fowle, Clapp & Soans, Attys.

Patented Sept. 28, 1926.

1,601,081

UNITED STATES PATENT OFFICE.

EDWIN A. PAGE, OF SAND SPRINGS, OKLAHOMA.

AUTOMOBILE COMPASS.

Application filed November 5, 1925. Serial No. 66,911.

My invention relates to a compass adapted for use on automobiles and the like to indicate to the driver the direction of travel of the vehicle by the magnetic needle.

Among the objects of the invention are to mount the compass in a novel manner at the dash or instrument board and windshield of an automobile whereby it may be readily viewed by the driver or chauffeur; to render the device sightly and attractive as an adjunct or attachment to the automobile or instrument board thereof; to provide for efficient lighting or illumination of the compass, that is the dial or needle or both by natural or artificial light and especially to admit light rays in the daytime whereby the position of the needle and reading of the compass are readily visible; to enclose the compass in a dust-proof case whereby the compass is protected against the weather and dust, collection and attack of foreign matter and corrosion and will at all times operate efficiently; to cause the compass to maintain its balance and level position to insure accurate readings on uneven roads, or when traveling up-grade and down-grade, and generally to improve, simplify and enhance the value and appearance of devices of this character and render the production thereof economical and facilitate the mounting thereof.

On the drawings:—

Fig. 1 is a vertical sectional view, showing the application of my novel compass to an automobile and the manner of association thereof with the instrument board or dash, windshield and cowl.

Fig. 2 is a front elevation of the device as shown in Fig. 1.

Fig. 3 is a horizontal sectional view taken on the line 3—3 of Fig. 1, and

Fig. 4 is an elevation showing a modified adjustable counterbalance weighting means for the compass.

Referring to the drawings in detail, 5 designates the glass windshield having or set in a frame 6 which fits the cowl 7 inclined forwardly therefrom to the usual hood housing the motor. The dash or instrument board is designated at 8 and is joined to the cowl at 9, said instrument board extending downwardly and then inclining rearwardly or inwardly in front of the operator's seat in the usual or any preferred way and being equipped with the usual dash light to illuminate the instrument board and compass under it, as will be hereinafter more fully set forth.

Mounted beneath the dash and cowl or angular part formed beneath the juncture thereof, is a dust and weather-proof receptacle 10 forming a casing or insulating cabinet for a compass, preferably of the marine type, generally designated at 11. The dash or instrument board is provided with a window opening 12 and the wall 13 of the receptacle or box has an opening 14 aligned therewith. The wall 13 of the receptacle is supported by and secured to the instrument board 8 by bolts, rivets or other fasteners 15 extending through registering openings in said parts around the margins of the openings and the rim of the wall 13 around the edge of the opening 14 is offset or spaced inwardly from the wall of the instrument board 8 to provide a frame seat for a glass or other transparent panel 16 providing a sight opening or window through which the compass is visible.

Of course, it is to be understood that light rays will pass through the window 16 so that the compass will be illuminated in the daytime by natural light and by the rays of the dash light at nighttime, whereby the dial and needle of the compass are readily visible and the direction of travel may be extended. However, in order to additionally illuminate or admit light rays into the receptacle to facilitate reading of the compass, the forwardly inclined cowl 7 may be provided with an opening 17 over a corresponding and aligned opening 18 in the inclined front portion or wall 19 of the receptacle 10. These parts are joined by bolts or other fasteners 20 and the margin of the wall 19 around the opening 18 is offset, as at 21, to provide a groove or seat for a transparent panel 22 of glass or other suitable material. This provides an additional sight opening which is, however, mainly for the purpose of admitting light to the compass within the receptacle.

It is also to be understood that suitable packing is interposed in the seat around the edges of the transparent panels or windows so that rain or moisture will be excluded as well as dust or other foreign matter.

The compass 11 is supported in such a manner as to maintain its equilibrium or level position in a horizontal plane, and for this purpose a ring 23 is pivoted at diametrically opposite points, preferably at the front and back in tapered screws 24 threaded in sleeves 25 in corresponding walls of the receptacle 10 and having the tapered ends thereof engaging corresponding bearing depressions in the periphery of the ring to provide a sensitive pivotal bearing for the ring and compass.

A gimbal ring 26 which may constitute the outer portion of the compass proper, is pivoted at right angles to the pivots of the ring 23 at diametrically opposite points thereof through the medium of the tapered screws 27 which are threaded through openings in the ring 23 and have their inner tapered ends engaging corresponding bearing depressions in the ring 26. By this means, the compass 11 will maintain its level position when the vehicle is tilted or inclined to either side, or in traveling upgrade or downgrade. To facilitate the action of this universal mounting and maintain the compass upright, in addition to mounting the compass in rings or gimbals as described, the bottom of the compass is weighted as indicated at 28 in Fig. 1 of the drawings, thus insuring proper balance under all conditions.

In Fig. 4 of the drawings the compass 11 is shown provided at the bottom with a threaded socket 29 adapted to receive an adjustable weight which may be in the form of a heavy set screw 30. By this means the weight is made adjustable so that the compass will maintain its level position without undue friction and without any possibility of it becoming inverted in position. Of course, the weight 28 will also prevent the compass from becoming inverted.

While I do not desire to be restricted to any particular materials in the construction of the parts, it may be pointed out that the receptacle or cabinet which encloses the compass is preferably made dust-proof and of metal with a glass front panel as well as at the cowl, if desired. The receptacle may be of stamped galvanized iron or insulation, thus providing an insulating casing for the parts. It is also to be understood that the device may be attached to any convenient place at the back side of the dash or instrument board with the face thereof flush, or substantially flush, with the front side of the board of any automobile or truck.

The receptacle or container for the compass is preferably made of either tin or aluminum, and the dial and needle, or both, may be luminous or radiolite. It will also be seen that with my device, the driver or chauffeur of an automobile may readily observe the compass without interfering with the operation of the machine. In addition to this convenience, the proper direction of travel may be obtained at all times. This will be of considerable help in traveling rural districts or in touring.

I am aware that various modifications and changes may be made without departing from the principles of my invention, and I reserve the right to make all such as fairly fall within the scope of the following claims.

I claim as my invention:

1. In a device of the class described, the combination with an instrument board provided with an opening, and a cowl, of a dust-proof casing having a side wall provided with an inwardly bent portion secured to the cowl, a second side wall having inwardly bent portion secured to the instrument board and cowl, the second side wall having a window registering with the opening in the instrument board, pivot pins carried by the side walls, and a compass pivotally supported by the pins.

2. In a device of the character described, the combination with an instrument board and a cowl, of a dust-proof casing having an open upper end secured snugly to the cowl and the instrument board, a compass pivotally supported in the casing, said cowl having a window for permitting illumination of the interior of the casing, the casing and instrument board where said casing is secured to the instrument board being provided with alined openings, and a transparent cover for the openings whereby the compass may be viewed from the exterior of the casing.

EDWIN A. PAGE.